United States Patent [19]
Carlsen et al.

[11] Patent Number: 5,946,985
[45] Date of Patent: Sep. 7, 1999

[54] SAW BLADE TOOTH FORM AND METHOD THEREFOR

[75] Inventors: Daniel J. Carlsen, Baltimore; George F. Parker, Severna Park, both of Md.

[73] Assignee: Black & Decker Inc., Newark, Del.

[21] Appl. No.: 08/932,645

[22] Filed: Sep. 17, 1997

Related U.S. Application Data

[62] Division of application No. 08/595,952, Feb. 6, 1996, abandoned, which is a division of application No. 08/293,122, Aug. 19, 1994, abandoned.

[51] Int. Cl.⁶ .................................................. B23D 65/02
[52] U.S. Cl. .......................... 76/112; 76/25.1; 23/13; 23/835
[58] Field of Search .................... 76/112, 25.1, 75, 76/76; 83/13, 835, 838, 846, 848, 849, 852, 853

[56] References Cited

U.S. PATENT DOCUMENTS

| | | |
|---|---|---|
| 29,982 | 9/1860 | Mason . |
| 71,473 | 11/1867 | Emerson . |
| 133,828 | 12/1872 | Brown . |
| 229,772 | 7/1880 | Suisse . |
| 352,624 | 11/1886 | Loughlin . |
| 391,843 | 10/1888 | Gray . |
| 503,522 | 8/1893 | Bowles . |
| 790,072 | 5/1905 | McLean . |
| 858,652 | 7/1907 | Harrison . |
| 1,336,209 | 4/1920 | Driver . |
| 1,649,864 | 11/1927 | Sherman . |
| 2,224,867 | 12/1940 | Hechler . |
| 2,535,439 | 12/1950 | McEwan . |
| 2,633,880 | 4/1953 | Mattson . |
| 2,635,327 | 4/1953 | Enlow . |
| 2,637,355 | 5/1953 | Chapin . |
| 2,648,360 | 8/1953 | Pall . |
| 2,750,669 | 6/1956 | Hohmann . |
| 2,757,697 | 8/1956 | Simmons et al. . |
| 3,071,027 | 1/1963 | Hiltebrand . |
| 3,091,266 | 5/1963 | Nelson . |
| 3,117,472 | 1/1964 | Mingus et al. . |
| 3,176,732 | 4/1965 | Henderson . |
| 3,208,310 | 9/1965 | Dunn . |
| 3,331,265 | 7/1967 | Kane . |
| 3,374,815 | 3/1968 | Anderson, Jr. et al. . |
| 3,630,699 | 12/1971 | Catlin . |
| 3,745,869 | 7/1973 | Ludwig . |
| 4,034,630 | 7/1977 | Nowak . |
| 4,325,272 | 4/1982 | Kelsey . |
| 4,604,933 | 8/1986 | Lesher et al. . |
| 4,627,165 | 12/1986 | Gibson . |
| 4,690,024 | 9/1987 | Chaconas . |
| 4,693,145 | 9/1987 | Gustavsson . |
| 4,867,026 | 9/1989 | Henning et al. . |
| 5,018,421 | 5/1991 | Lucki et al. . |
| 5,106,497 | 4/1992 | Sundström . |

FOREIGN PATENT DOCUMENTS

| | | |
|---|---|---|
| 3939205 | 5/1990 | Germany . |
| 812574 | 4/1977 | Russian Federation . |
| 578405 | 8/1976 | Switzerland . |
| 522138 | 6/1940 | United Kingdom . |

Primary Examiner—Rinaldi I. Rada
Assistant Examiner—Charles Goodman
Attorney, Agent, or Firm—Harness, Dickey & Pierce, P.L.C.

[57] ABSTRACT

A saw blade has a plurality of teeth with each tooth formed by a beveled gullet forming a trailing face, a beveled gullet forming a leading face and a planar surface forming a curved cutting face. The gullets forming the trailing face and the leading face are beveled in opposite directions. The planar surface is generally parallel to the beveled trailing face. The unique tooth profile provides a saw tooth having a positive rake angle to significantly improve the strength of the tooth. The method of manufacturing of the unique tooth profile begins by orienting a saw blade blank about three axes and performing a first grinding operation which forms every other tooth gullet and every other planar surface. The partially formed blank is then oriented about two of the three axes in an opposite direction and a second grinding operation is performed. The second grinding operation grinds the remaining gullets and planar surfaces. The unique tooth profile of the present invention is applicable to jigsaw blades, linear edge saw blades and circular saw blades as well as the various types of bi-metal saw blades.

14 Claims, 9 Drawing Sheets

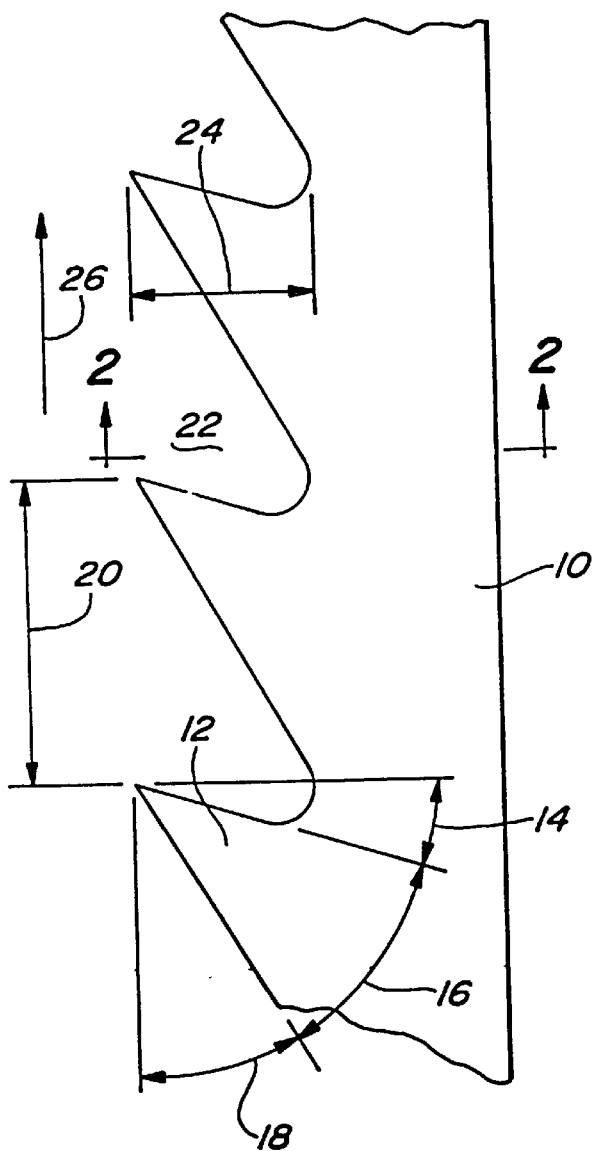
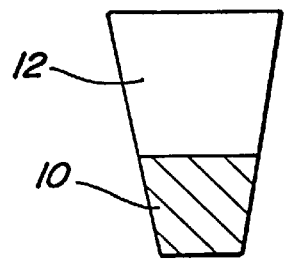
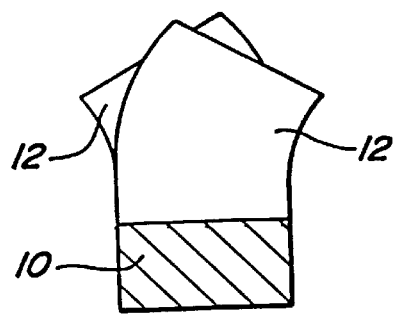

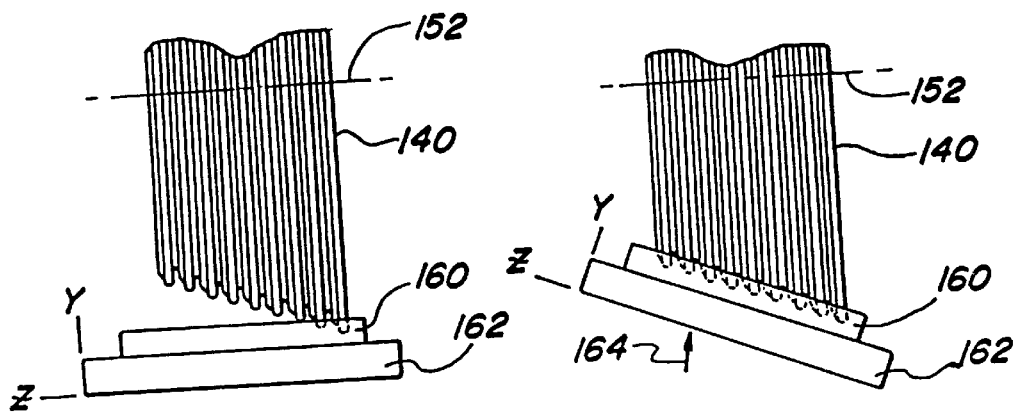
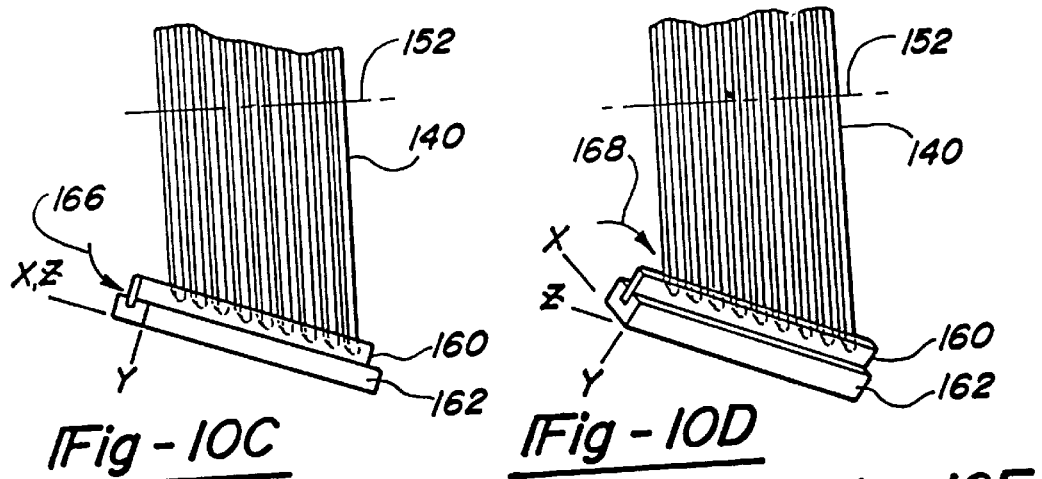
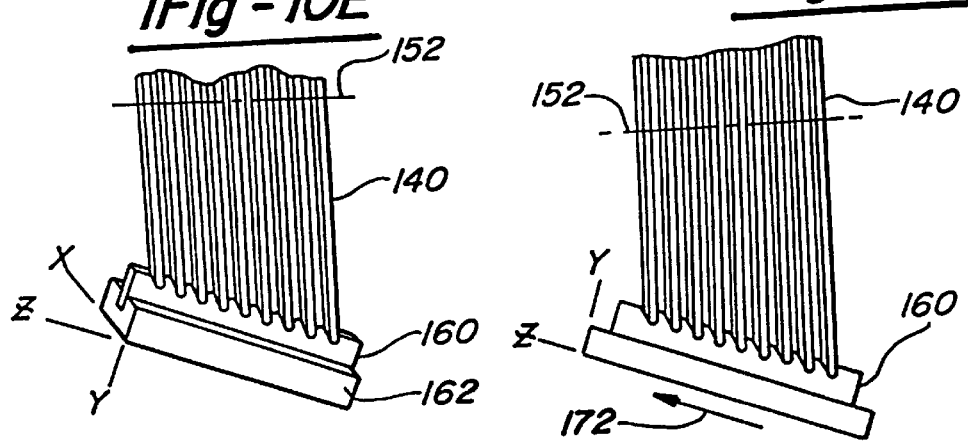

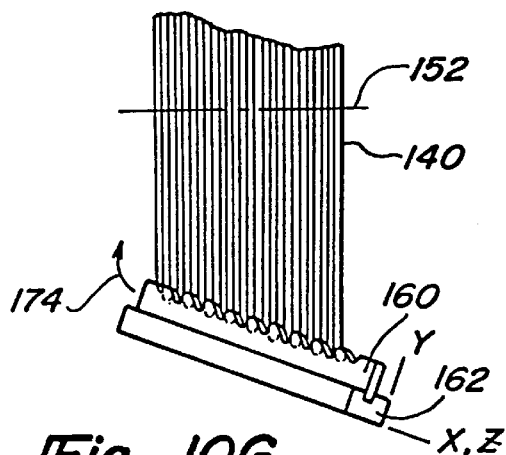
Fig-10G
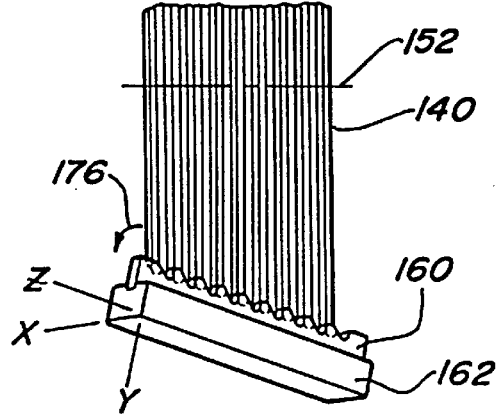
Fig-10H
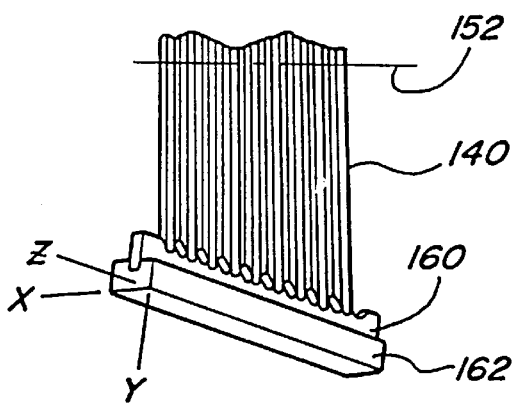
Fig-10I
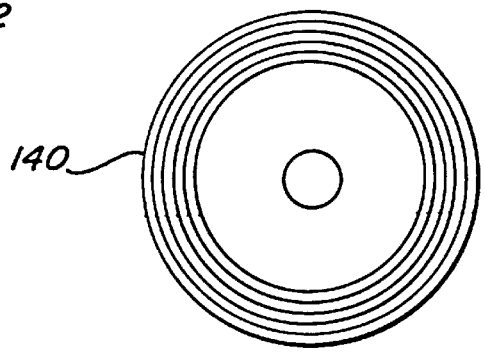
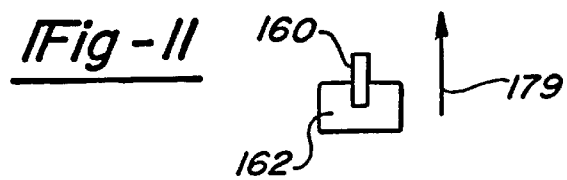
Fig-11

SAW BLADE TOOTH FORM AND METHOD THEREFOR

This is a division of U.S. patent application Ser. No. 08/595,952 filed Feb. 6, 1996, now abandoned which is a division of U.S. application Ser. No. 08/293,122 filed Aug. 19, 1994, now abandoned.

FIELD OF THE INVENTION

The present invention relates to saw blades. More particularly, the present invention relates to a unique design of saw tooth profile for saw blades and a method of manufacturing saw blades having this unique design of saw tooth profile.

BACKGROUND OF THE INVENTION

A typical saw blade has a blade edge made up of a sequence of sharp points which are referred to as teeth. These teeth cut a trench or kerf that allows the free entry of the saw blade to cut an article. The cutting action of the saw blade involves urging the article to be cut transversely into the rotating or longitudinally moving saw blade or transversely urging the moving saw blade into the article. As the saw blade and article are urged together, the teeth of the saw blade dig in and remove particles from the article in a rapidly repetitive action. By this repetitive action, the kerf is increased in depth until the article is cut. This cutting action which remove a portion of the article is substantially different than "slicing" where the fibers of the article are simply moved apart.

FIG. 1 illustrates a portion of a conventional saw blade 10 showing the profile of a conventional tooth 12. Tooth 12 includes a positive hook angle 14, a tooth angle 16 and a clearance angle 18. Other nomenclature used in the description of saw teeth include the tooth pitch or spacing 20, the tooth gullet 22 and the depth of the gullet 24. The direction of cut for saw blade 10 is shown by arrow 26. During the cutting of an article by a saw blade, there must be sufficient clearance between the saw blade and the sawn surfaces or sidewalls of the kerf being created in order to eliminate binding or friction between the saw blade and the cut article. This clearance can be achieved by either taper grinding or offsetting the saw tooth. Taper grinding, shown in FIG. 2A, is a process that removes the material on the sides of the saw blade to make the cutting tip the widest part on the blade. Offsetting, shown in FIG. 2B, is a process that bends or places a "set" in the saw tooth to make the cutting tip the widest part on the blade. Either method, taper grinding or offsetting, provides the necessary clearance between the saw blade and the sidewalls of the kerf being made in the article to eliminate any binding of the saw blade in the kerf.

Various improvements to the conventional tooth profile shown in FIG. 1 have been proffered. FIGS. 3A and 3B illustrate a saw blade 30 cutting into an article 31. Saw blade 30 has a plurality of teeth 32 having a positive hook angle 33 which incorporate "fleam grinding" or alternate beveling of each gullet 34 between the plurality of teeth 32. In particular, the plurality of teeth 32 have their front faces 36 and their rear faces 38 oppositely beveled. This is accomplished by having the bevel on the front gullet of each tooth 32 facing in the opposite direction to the bevel on the rear gullet of each tooth 32 in alternate order throughout the saw blade. This beveled tooth profile generates a tooth point of substantially triangular prismatic shape which better enables the teeth to effect the removal of portions of the article. The triangular prismatic tooth profile is manufactured by grinding each tooth gullet 34 in a direction which is opposite to that of an adjacent tooth gullet 34. Grinding each gullet 34 simultaneously grinds a front face 36 of one tooth and a rear face 38 of the tooth adjacent to it. This grinding or beveling of each gullet 34 is normally done at a compound angle, which causes the bottom of each gullet 34 between the teeth 32 to slope in an upwards and a backwards direction due to the beveled front face of each tooth meeting the beveled rear face of the tooth in front of it in an oblique line. This beveling of the gullets is designed to aid in the removal of cut material from the gullets. However, the conventional fleam ground blade still packs the gullets with chips and dust The compound beveling of the gullets creates a dead space or neutral area in the bottom of the gullet due to one face of the gullet directing chips to one side of the blade with the opposite face of the gullet directing chips to the opposite side of the blade. This dead space or neutral area causes the undesirable accumulation of chips within the base of the gullet. This problem is especially acute when the thickness of the material being cut is large or exceeds the stroke of the blade, which is typically between one-half of an inch and one inch. This conventional compound beveling creates a tooth cutting edge 39 having a conventional negative rake angle 40 (FIG. 3B). A negative rake angle provides an aggressive cutting tooth and causes the highest (relative to the base of the gullet), leading tip of the cutting face on the conventional fleam-ground tooth-form to always contact the workpliece first during the forward stroke of the cutting blade as shown by arrow 41 with the remainder of the cutting face being angled downwardly and rearwardly away from the surface being cut. This can be seen in FIGS. 3A and 3B where the higher, leading tip 42 contacts the workpiece first and the lower, trailing tip 41 will contact the workpiece last during the cutting stroke. A negative rake angle is present when measured from the lowest point to the highest point of the cutting edge, the cutting edge is toward the cut with respect to horizontal as seen in FIG. 3B.

Various other tooth profiles for saw blades have been proposed. However, most of these earlier known designs have not experienced widespread commercial use as they typically do not lend themselves to automated manufacturing processes and therefore are too costly to produce. Consequently, there is a need to continue with the development of saw tooth profiles and there is also a need for improving the known manufacturing processes to mass-produce improved saw tooth profiles in a cost-effective manner.

SUMMARY OF THE INVENTION

The present invention provides the art with a saw blade exhibiting improved strength by having a body with a plurality of saw teeth having a unique tooth profile disposed along one edge of the blade. The leading and trailing faces of each saw tooth are formed by a radiused beveled gullet. The gullet of the trailing face is beveled in an opposite direction to the gullet of the leading face. This opposite beveling of the gullets is in alternate order throughout the saw blade. A cutting edge is formed on the point of each tooth by the intersection of the leading face of each tooth and a planar surface generally parallel to the beveled gullet of the trailing face of each tooth. The unique profile of the saw tooth of the present invention provides a saw tooth having a positive rake angle which yields a larger amount of blade material under the cutting face. This larger amount of material significantly increases the strength of the blade, greatly enhances the blade's stability and increases the blade's life and sharpness retention.

In addition to the unique profile of the saw teeth, the present invention provides the art with a unique manufacturing process for manufacturing the tooth profile according to the present invention.

Other advantages and objects of the present invention will become apparent to those skilled in the art from the subsequent detailed description, appended claims and drawings.

BRIEF DESCRIPTION OF THE DRAWINGS

In the drawings which illustrate the best modes presently contemplated for carrying out the present invention:

FIG. 1 is a side elevational view of the tooth-form for a conventional saw blade;

FIG. 2A is a view in the direction of arrows 2—2 in FIG. 1 showing saw blade clearance achieved by taper grinding;

FIG. 2B is a view similar to that of FIG. 2A but showing saw blade clearance achieved by offsetting;

FIGS. 10A through 10I illustrate schematically the steps of the manufacturing process required to produce the tooth profile according to the present invention;

FIG. 11 illustrates schematically another method for achieving the necessary movement between the working piece blanks and the grinding wheel in order to produce the tooth profile of the present invention.

DETAILED DESCRIPTION OF THE PREFERRED EMBODIMENTS

Figures 4, 5, 6:
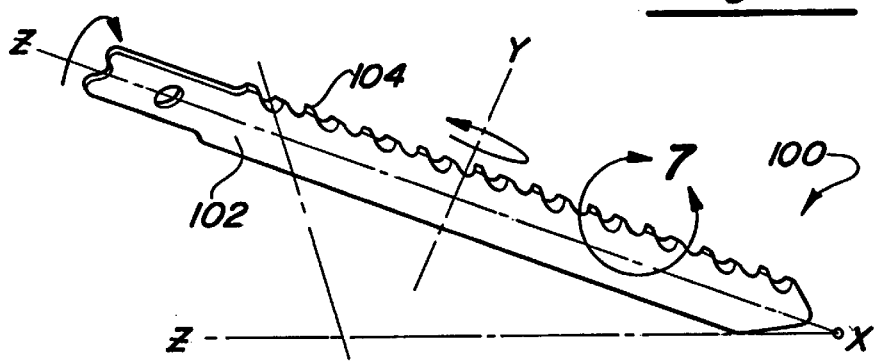
FIG. 4 is a perspective view of a saw blade incorporating the tooth profile in the manufacturing position according to the present invention.
FIG. 5 is a side elevational view of a portion of the saw blade shown in FIG. 4.
FIG. 6 is an edge view of the teeth of the portion of the saw blade shown in FIG. 5.
Figure 7:
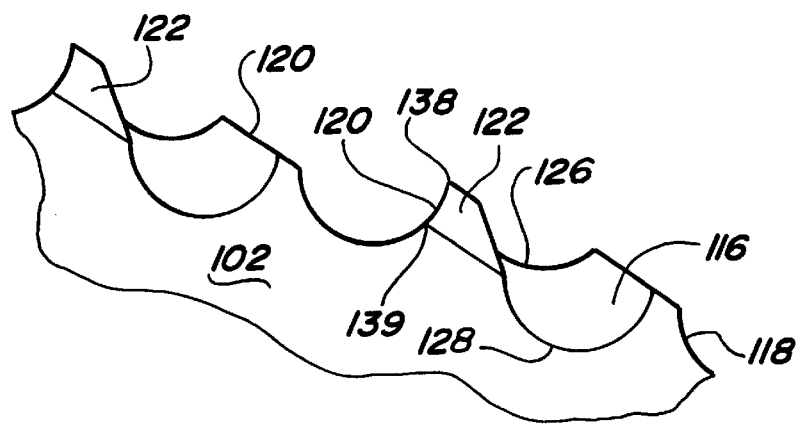
FIG. 7 is an enlarged perspective view showing the saw tooth profile according to the present invention.
Figure 7A:
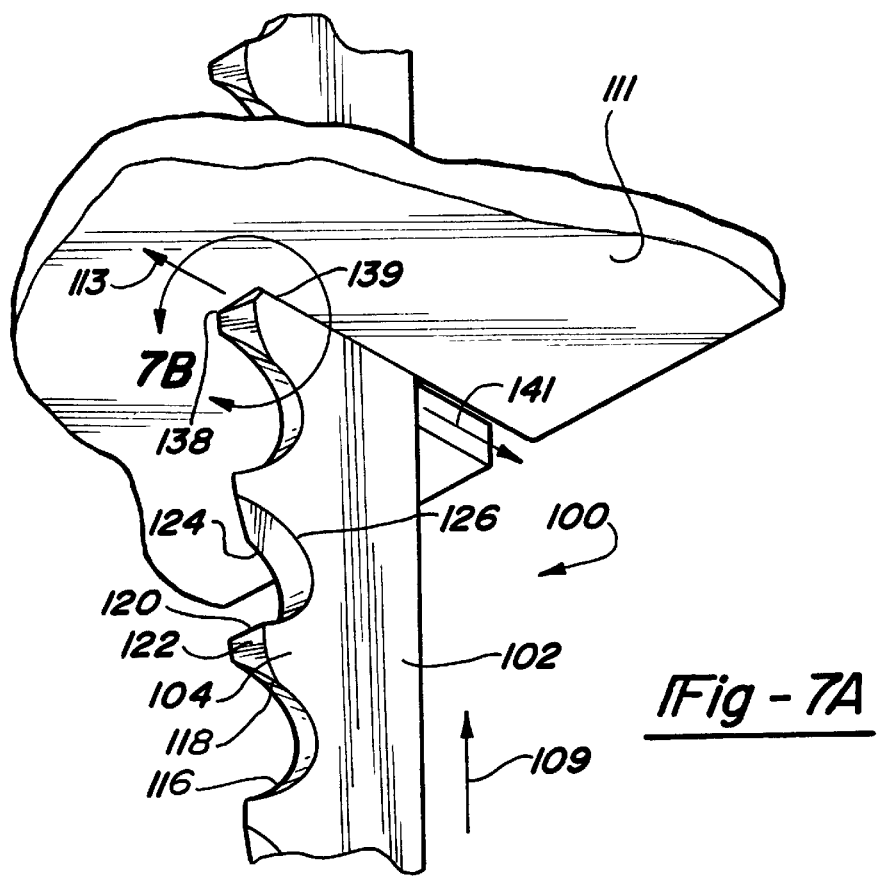
FIG. 7A is a perspective view of a saw blade in accordance with the present invention after cutting partially through an article.
Figure 7B:
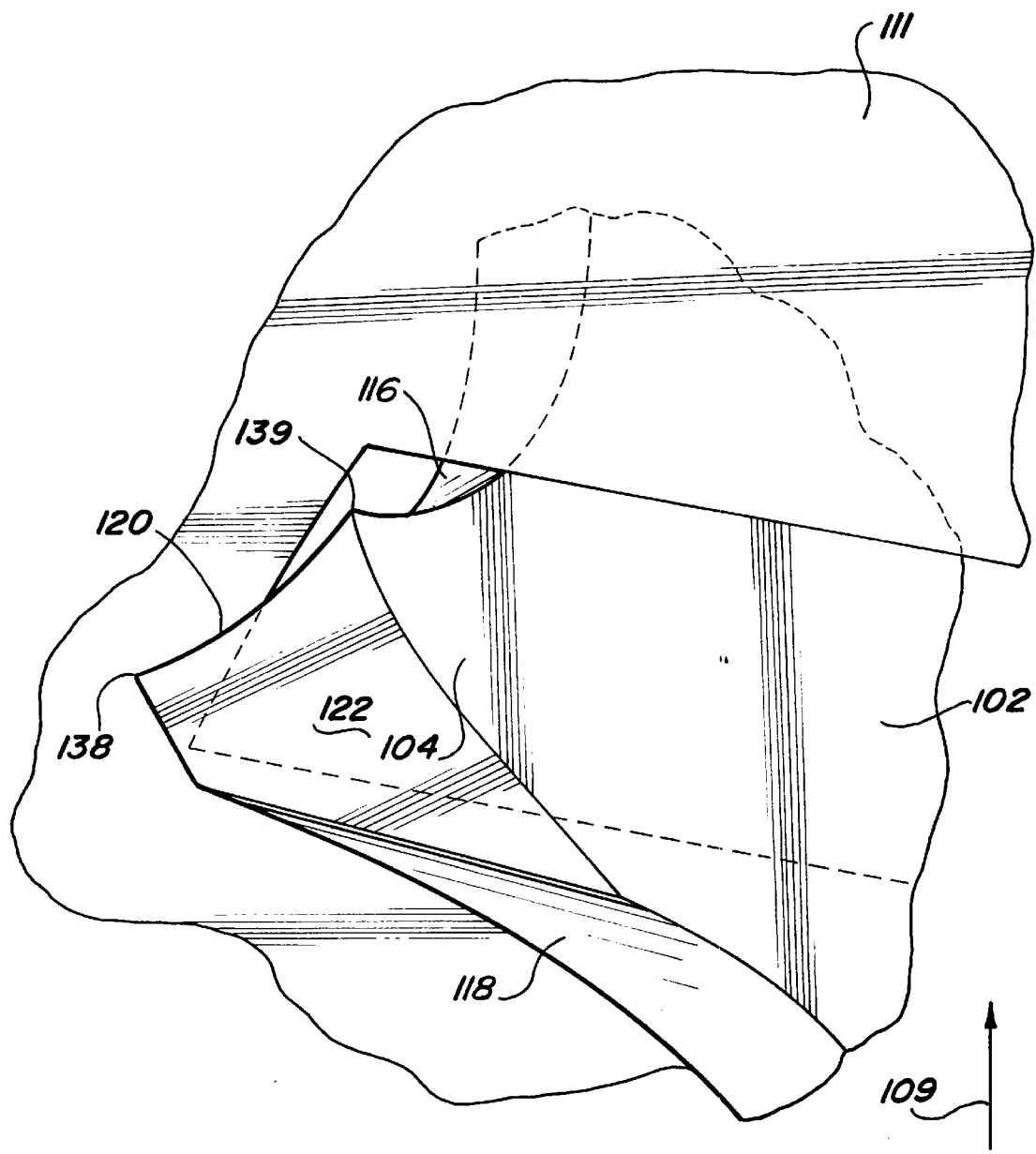
FIG. 7B is an enlarged view of the area defined by circle 7B—7B shown in FIG. 7A.

Referring now to the drawings in which like reference numerals designate like or corresponding parts throughout the several views, there is shown in FIGS. 4 through 7B a saw blade incorporating the tooth profile according to the present invention which is designated generally by the reference numeral 100. Saw blade 100 comprises a body 102 having a plurality of teeth 104 and two side faces 106 and 108. Body 102 is shown, for exemplary purposes in FIG. 4, as a jigsaw blade. It is to be understood that the tooth profile of the present invention and the method of manufacturing the tooth profile of the present invention may be incorporated into any type of linear saw blade as well as any type of circular saw blade. Saw blade 100 cuts by being moved in the direction of the arrow 109 shown in FIGS. 5 and 6. Each tooth 104 is formed by two successive gullets 110 with each gullet 110 being located on opposite sides of tooth 104 along the longitudinal axis 112 of body 102. Each gullet 110 is formed at a compound angle relative to the three axes shown in FIG. 4 and includes a radiused beveled contour 114 which is beveled in a direction "rearward" (away from the direction of cut), to the "side" (towards one of the two faces 106 and 108) of saw blade 100, and "downwardly" (towards a non-cutting edge 103) of saw blade 100 (FIG. 5). Teeth 104 have their "front" or leading faces 116 and their "rear" or trailing faces 118 oppositely beveled with the bevels on the gullet of leading face 116 facing in the symmetrically opposite direction to the bevel on the gullet of trailing face 118 in alternate order throughout saw blade 100.

A curved cutting edge 120 of each tooth 104 is formed by the intersection of the beveled gullet on front face 116 and a generally planar trapezoidal-shaped surface 122 on rear face 118 as shown in FIG. 5. Two additional cuyying edges 124 and 126 are formed at the intersection of beveled contour 114 with opposite faces 106 and 108 of body 102 during beveling of the blade. The angle for surface 122, in a preferred embodiment, is generally parallel to the beveled gullet which is located directly below or away from the direction of cut. This produces a tooth profile whereby each front face 116 is beveled in one direction and each rear face 118 and surface 122 are beveled in a symmetrically opposite direction. Thus, as shown in FIGS. 5, 6, 7, 7A and 7B, curved cutting edge 120 is angled away from the direction of cut from the lowest to the highest point of curved cutting edge 120 or at what is a positive rake angle 128 (FIG. 6). In addition, as shown in FIG. 5, curved cutting edge 120 includes a leading portion 130 which is angled below a line 129 which is perpendicular to the direction of cut 109 or what is defined as a negative hook angle 132 and a trailing portion 134 which is angled above line 129 or what is defined as a positive hook angle 136. The switch from negative hook angle 132 to positive hook angle 136 occurs at a position along the length of cutting edge 120. Adjacent teeth 104 have the beveled surfaces, the positive rake and compound hook angles angled in alternately opposite directions. These positive rake and compound hook angles produce a large amount of blade material under cutting edge 120 of each tooth 104 which greatly enhances stability and increases life and sharpness retention.

As shown in FIGS. 5 through 7B, the unconventional profile of tooth 104 has a higher, more rearward trailing tip 138 performing as the cutting tip which contacts the workpiece first, while a lower, more forward leading tip 139 is positioned to contact the workpiece last. This unique structure is also created by the coaction of the positive rake and the compound hook angles of tooth 104. The cutting action of the unique profile of tooth 104 can be seen in FIGS. 7A and 7B. The cutting action of tooth 104 will be discussed in conjunction with the amount of feed or depth of feed of saw blade 100 into an article 111 being cut. As saw blade 100 is moved in its cutting direction 109 (or longitudinally with respect to article 111), the amount or depth of feed 113 is defined as the amount of movement of blade 100 perpendicular to longitudinal axis 112 of saw blade 100. This perpendicular movement or feed 113 of each tooth 104 engages article 111 while the longitudinal movement of saw blade 100 cause the actual cutting of the article by removing small amounts or chips of material. As the amount of feed 113 of saw blade 100 into article 111 is increased, the amount of cutting length of cutting edge 120 of tooth 104 which contacts article 111 is also increased. As cutting edge 120 contacts article 111, it begins to shave or peel away portions of the material of article 111. The length of cutting edge 120 which is in contact with article 111 is directly proportional to the amount of feed of saw blade 100 into article 111.

Figures 3A, 3B:
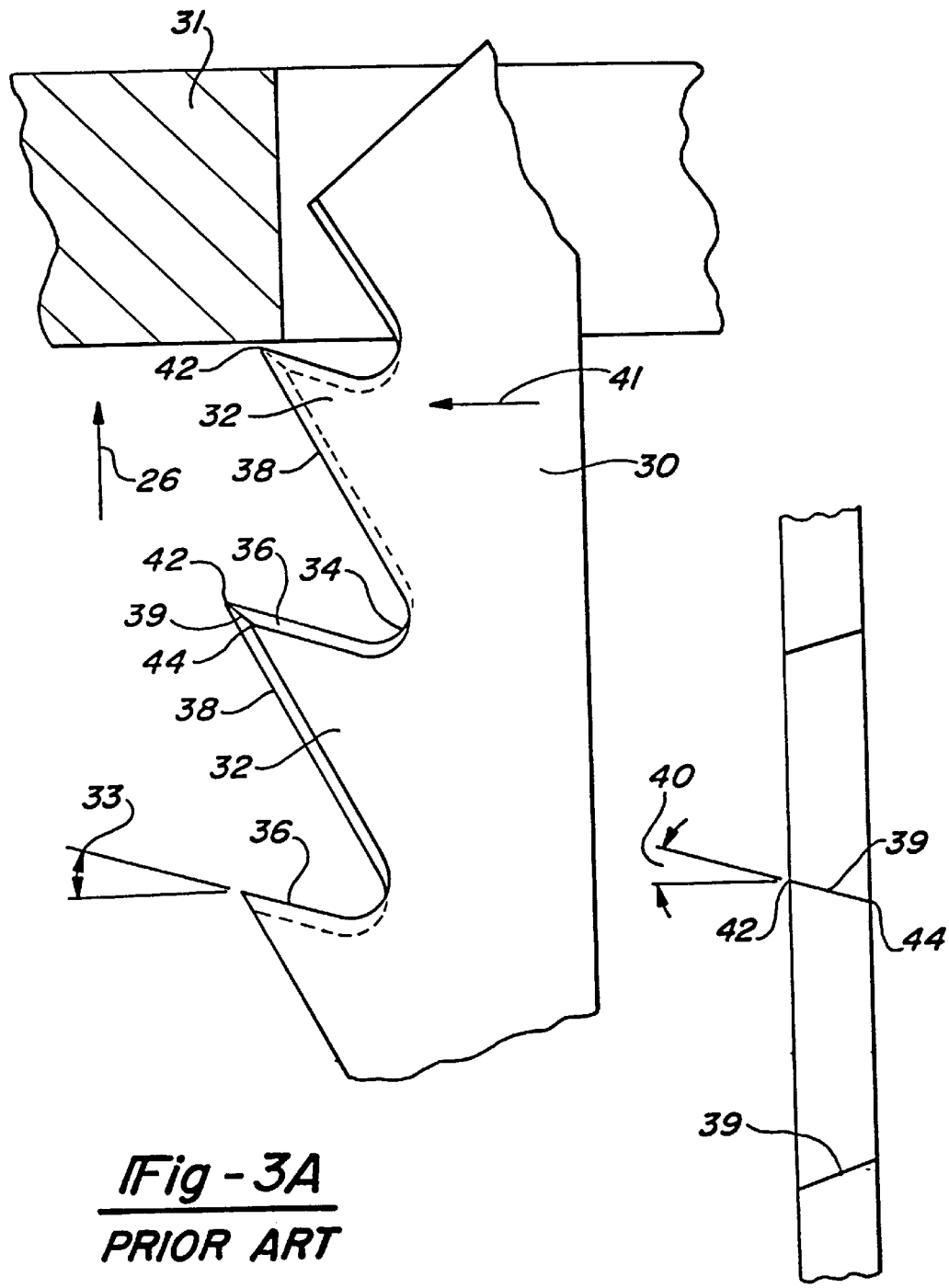
FIG. 3A illustrates the tooth-form for a conventional fleam-ground saw blade having beveled gullets.
FIG. 3B is an edge view of the teeth of the saw blade shown in FIG. 3A.

The cutting begins with trailing tip 138 contacting article 111. As saw blade 100 is fed into article 111, the point of contact with cutting edge 120 moves toward leading edge 139. As the point of contact between article 111 and cutting edge 120 moves into the negative hook-angled portion 130 of cutting edge 120, a force vector 141 is produced which has the tendency to force saw blade 100 in a direction opposite to the direction of feed 113. The strength of this force vector will be determined by various parameters, including, without limitation, the force applied to saw blade 100 in the direction of feed 113 and the hardness of the material being cut. In normal operation, the force applied to saw blade 100 in the direction of feed 113 will exceed this force vector and thus allow for the continued cutting of article 111. Force vector 141 created in the present invention by the positive rake angle and the compound hook angle also allows saw blade 100 to deflect away from the workpiece when it encounters a foreign object such as a nail. The strength of force vector 141 will increase significantly when saw blade 100 contacts a nail, largely due to the hardness of the nail. This increase in the strength of force vector 141 will have the tendency to push saw blade 100 away from the nail. This is substantially different from the conventional tooth-form shown in FIG. 3A where the higher, leading tip 42 is required to break away a larger amount of the article as saw blade 30 is fed further into the article. The negative hook angle of saw blade 30 produces a force vector 41, as shown in FIG. 3A, which causes saw blade 30 to actually self-feed into the article which can result in the jamming and/or breakage of saw blade 30. This increased load leads to decreased stability and decreased life and sharpness retention. Also, when the conventional tooth-form shown in FIG. 3A contacts a nail, saw blade 30 is drawn into the nail due to force vector 41, shown in FIG. 3A, rather than deflected away from the nail as in the present invention due to force vector 141, shown in FIG. 7A.

Figure 8:
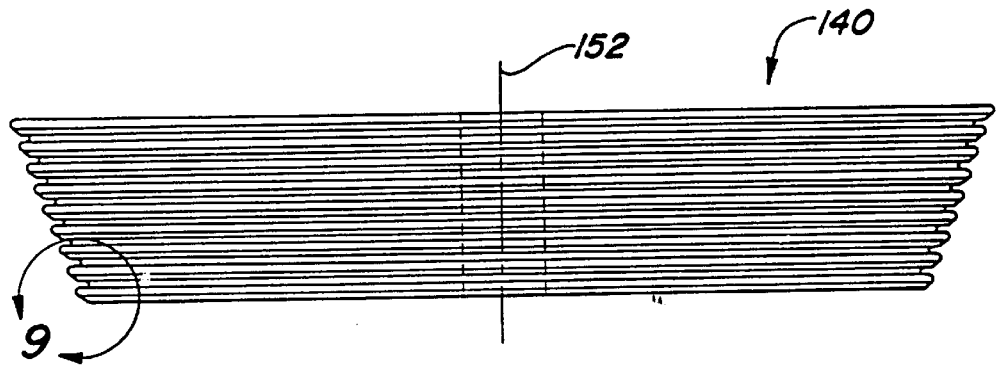
FIG. 8 is a side elevational view of the grinding wheel used to manufacture the tooth profile according to the present invention.
Figure 9:
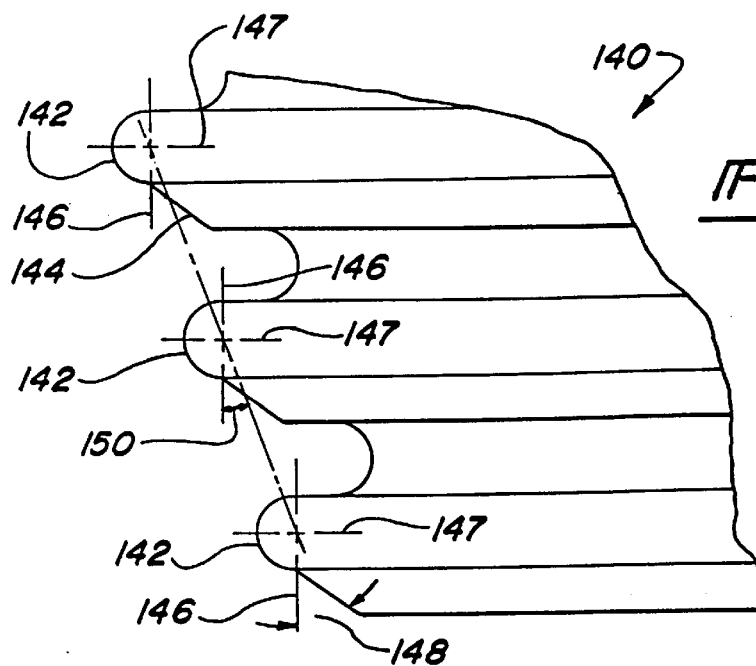
FIG. 9 is an enlarged view of the grinding surface profile of the grinding wheel in the circled area 9 shown in FIG. 8.

The positive-rake, compound hook angle tooth-form of the present invention is manufactured in a unique way. Referring now to FIGS. 8 and 9, cutting tool in the form of a grinding wheel 140 has a plurality of curved grinding surfaces 142 adjacent a plurality of angular grinding surfaces 144 to form a plurality of formed grinding teeth. As shown in FIG. 9, each angular grinding surface 144 is angled from the vertical axis 146 of a respective cylindrical grinding surface 142 by a specified angle 148. Angle 148 is preferably approximately 55° although this angle can range anywhere from 40° up to 65° if desired. The positioning and relationship of grinding surfaces 142 and 144 form the tooth profile for each tooth 104 described above. Grinding surfaces 142 form radiused beveled contours 114 for gullets 110 and grinding surfaces 144 form planar surfaces 122. The radius for grinding surfaces 142 will be equal to the radius of beveled contour 114 and can range anywhere from 25% up to 40% of the tooth pitch. The plurality of grinding surfaces 142 and 144 are arranged longitudinally along the exterior surface of grinding wheel 140 at an angle 150 relative to the axis 152 of grinding wheel 140. Preferred dimensions, in millimeters and degrees, for saw blade 100 having various tooth pitches are given in the chart below:

| TOOTH PITCH | BEVEL CONTOUR RADIUS (REF. NO. 114) | GULLET ANGLE (REF. NO. 150) | BEVEL COMPOUND ANGLE (REF. NO. 113) |
| --- | --- | --- | --- |
| 2.0 | .78 | 20.0 | 39.0 |
| 2.5 | .78 | 20.0 | 50.0 |
| 3.0 | .87 | 20.0 | 51.7 |
| 4.0 | 1.25 | 20.0 | 55.0 |

Referring now to FIGS. 5, 10A through 10I, the manufacturing process for saw blade 100 is shown as requiring two separate grinding operations by grinding wheel 140. Because alternating teeth 104 on body 102 are oppositely beveled both downwardly and to the side, every other gullet 110 and a corresponding planar surface 122 are formed by one grinding pass of grinding wheel 140, with body 102 being positioned in a first relationship to grinding wheel 140. Upon completion of the first grinding pass, which forms the first one-half of gullets 110 and surfaces 122, body 102 is repositioned in a second relationship to grinding wheel 140, and body 102 is moved axially one tooth length. The second relationship to grinding wheel 140 is made symmetrically opposite to the first relationship. A second grinding pass is then made which forms the remaining gullets 110 and surfaces 122. Thus, it can be seen that the distance between successive horizontal centerlines 147 on grinding wheel 140, as shown in FIG. 9, will be equal to twice the pitch of teeth 104 on saw blade 100, multiplied by the cosine of the angle about the X-axis, and further multiplied by the cosine of the angle about the Y-axis.

The manufacturing process, as shown in FIGS. 10A through 10I, begins by first placing a blank 160, or a plurality of blanks 160, into a fixture 162 as shown in FIG. 10A. Typical materials which can be utilized to manufacture saw blade 100 from a single specification of material include high carbon steels, for example, SAE 1070, SAE 1095 or D6A, with D6A being the preferred material. The manufacturing process involves rotating blanks 160 around the X-axis to produce a roll angle, around the Y-axis to produce a yaw angle, and around the Z-axis to produce a pitch angle. The X-axis is defined as being perpendicular to the plane of the paper in FIGS. 10A, 10B, and 10F. The Y-axis is defined as being in the plane of the paper but perpendicular to the longitudinal axis of blank 160. Finally, the Z-axis is defined as being in the plane of the paper but parallel to the longitudinal axis of blank 160. The fixture 162 is set up so that the blank 160 is rotated about its X-axis as shown by the arrow 164 in FIG. 10B to produce a roll angle which is generally equal to angle 150 on grinding wheel 140. As shown in the previous chart, the preferred roll angle is approximately 20°, although this angle could be selected anywhere from 0° up to 30° if desired. This orientation brings the longitudinal axis of blank 160 generally parallel with the face of the plurality of grinding surfaces 142 and 144 on grinding wheel 140. The fixture 162 further orients blank 160 about its Y-axis to produce a yaw angle relative to grinding wheel 140, as shown by the arrow 166 in FIG. 10C. As shown in FIG. 10C, the rotation about the Y-axis has the effect of orienting blank 160 out of the paper about the vertical axis in the plane of the paper in FIG. 10C. The relationship between the yaw angle and grinding wheel 140 produces the downwardly angled component for the beveling of both gullet 110 and surface 122. In a preferred embodiment, the yaw angle is approximately 30° although this angle could be selected anywhere from 0° up to 60° if desired. The fixture 162 further orients blank 160 about its Z-axis or the longitudinal axis of blank 160 to produce a pitch angle relative to grinding wheel 140 as shown by the arrow 168 in FIG. 10D. The relationship between the pitch angle and grinding wheel 140 produces the component angled to the side for the beveling of both gullet 110 and surface 122. In the preferred embodiment, the pitch angle is approximately 30° although this angle could be selected anywhere from 0° up to 40° if desired. It should be noted that the above description of the three-axis orientation is exemplary in nature and not intended to restrict the process.

Using a form of a "creep-feed" process, blank 160 is then moved through grinding wheel 140, in this case in a direction which is generally perpendicular to the plane of the paper. This movement causes grinding wheel 140 to form every other or one-half of gullets 110 and the adjacent surfaces 122 in a single pass. In some applications. It may be advantageous to form every other or one-half of gullets 110 by moving grinding wheel 140 through blank 160 instead of moving blank 160 through grinding wheel 140. The same "creep-feed" process is used when grinding wheel 140 is moved through blank 160. If it is desired to manufacture a blade according to the present invention using conventional surface grinding techniques, it can be appreciated that multiple passes between grinding wheel 140 and blank 160 will need to be made.

After the first grinding pass, half-finished blanks 160 are repositioned with respect to grinding wheel 140 to the position shown in FIG. 10F. The roll angle on the X-axis remains constant during the first and second grinding passes of blank 160. Fixture 162 moves blanks 160 longitudinally, as shown by the arrow 172 in FIG. 10F, one tooth length (one tooth pitch) in order to form the remaining gullets 110 in between the previously formed gullets 110. Blank 160 is oriented about the various axes in a similar fashion to that noted above. Blank 160 is rotated about its Y-axis to produce a yaw angle relative to grinding wheel 140 as shown by the arrow 174 in FIG. 10G. As shown in FIG. 10G, the rotation about the Y-axis has the effect of rotating blank 160 about the vertical axis in the plane of the paper. In this embodiment, the yaw angle shown in FIG. 10G has the same value as the yaw angle shown in FIG. 10C but is opposite in direction. Just as was described above, the relationship between the yaw angle and grinding wheel 140 produces the downwardly-angled component for beveling both gullet 110 and surface 122, but in FIG. 10G, the direction is opposite to the beveling produced by the previous yaw angle shown in FIG. 10C. The last element in the orientation of fixture 162 is established when blank 160 is rotated about its Z-axis or the longitudinal axis of blank 160 to produce a pitch angle relative to grinding wheel 140, as shown by the arrow 176 in FIG. 10H. In this embodiment, the pitch angle shown in FIG. 10H is the same value as the pitch angle shown in FIG. 10D but opposite in direction. As noted above, the relationship between the pitch angle and grinding wheel 140 produces the component of the compound angled bevel which is angled to the side for beveling both gullet 110 and surface 122. However, in FIG. 10H, the direction is opposite to the beveling produced by the previous pitch angle shown in FIG. 10D.

Blank 160 is again moved through grinding wheel 140 or, again in this case, in a direction which is generally perpendicular to the plane of the paper. This movement causes grinding wheel 140 to form the remaining other half of gullets 110 and the adjacent surfaces 122 in a single pass of blank 160 through grinding wheel 140. Again, it may be advantageous in some applications to move grinding wheel 140 through blank 160 instead of blank 160 though grinding wheel 140. Similar to the initial grinding operation shown in FIG. 10E, this movement between blank 160 and grinding wheel 140 also produces the compound angle for teeth 104 due to the rotation of blank 160 about its various axis.

Although for exemplary purposes, the movement of blank 160 relative to grinding wheel 140 is detailed as blank 160 moving through grinding wheel 140 or grinding wheel 140 moving through blank 160, it is within the scope of the present invention to position blanks 160 vertical to grinding wheel 140 (as shown in FIG. 11), then to provide the necessary orientations of blanks 160 with respect to grinding wheel 140, and finally, to move blanks 160 vertically through grinding wheel 140 as shown by the arrow 179 in FIG. 11.

In addition, for exemplary purposes, blank 160 has been shown as being formed or ground using grinding wheel 140. It is within the scope of the present invention to form blank 160 from a milling cutter or other types of forming wheels known in the art.

It may be advantageous to manufacture saw blade 100 from a bi-metal material, namely, a material made from two different specifications of material. The tips of teeth 104 can be manufactured from a high-carbon/speed steel to enable the hardening of teeth 104 while body 102 of saw blade 100 can be manufactured from a lower carbon steel to limit the hardenability of body 102 and therefore maintain ss ductility. As shown in phantom in FIG. 5, if saw blade 100 is manufactured from two different specifications of material, it will include a weld seam 175. It is preferred that the bi-metal weld seam 175 be above the base of gullet 110 but below cutting edge 120. As can be seen in FIG. 5, the bottom of radiused contours 114 in gullet 110 extend into the base or low hardenability material of body 102 to provide ductility to each tooth 104 while the tips of each tooth 104 are manufactured from the high hardenability material to maintain sharpness of cutting edges 120. Typical materials which can be used to manufacture saw blade 100 from a bi-metal strip of material include a high speed steel such as M2, M42 or similar material for the tips of the teeth (with M42 being the preferred material), and an alloy steel such as SAE 6150, D6A or similar material for the body (with D6A alloy steel being the preferred material).

Figure 12:
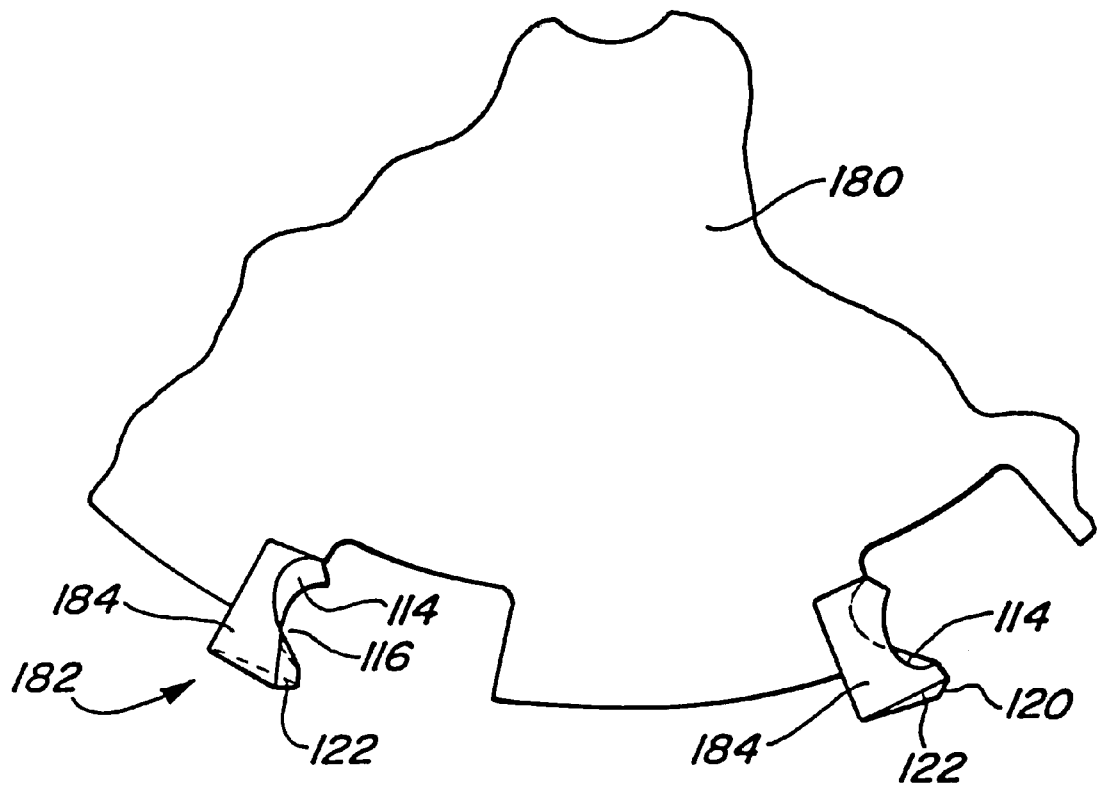
FIG. 12 is a side elevational view of another embodiment of the present invention where the tooth profile of the present invention is incorporated onto a plurality of carbide inserts secured to a circular saw blade.

FIG. 12 shows another embodiment of the present invention, a portion of a circular saw blade 180 having a plurality of teeth 182. Each tooth 182 includes an insert 184 which is carbide or other relatively hard material. Insert 184 is secured to saw blade 180 in a conventional manner such as by brazing or other means known in the art. Each insert 184 includes the cutting tooth profile of the present invention, namely beveled contour 114 with its associated leading face 116 and surface 122. For this embodiment of the carbide inserts, the angle for surface 122 is symmetrically opposite to beveled contour 114, similar to the embodiment described above for FIGS. 5–7A. Each insert 184 is beveled in an opposite direction to that of an adjacent insert 184, in alternate order throughout saw blade 180. Each insert 184 further includes surface 122 located on the trailing face of insert 184. Curved cutting edge 120 on the tip of each insert 184 is thus formed by beveled contour 114 and lateral surface 122. Thus, similar to the previous embodiments, each insert 184 is provided with curved cutting edge 120 angled towards the direction of cut shown by arrow 109 in what is defined as a positive rake angle. Adjacent inserts 184 have beveled surfaces 114 and the positive rake angle angled in alternately opposite directions. Typical materials which can be utilized for inserts 184 include C2 and C4 cemented carbides with C4 cemented carbide being the preferred material.

Inserts 184 are manufactured using a conventional sintering operation to first rough form each insert 184. The rough formed inserts are then attached to blade 180 by brazing or by other means known well in the art. The side surfaces of each insert are then taper ground in a conventional manner to create cutting edges 124 and 126 and to provide clearance for saw blade 180. Upon completion of the taper grinding operation, each insert is ground on its upper surface to form surface 122 at the appropriate angle. Adjacent inserts have surfaces 122 ground in an opposite direction in alternate order throughout saw blade 180.

While the above detailed description describes the preferred embodiment of the present invention, it should be understood that the present invention is susceptible to modification, variation and alteration without deviating from the scope and fair meaning of the subjoined claims.

What is claimed is:

1. A method of forming a tooth form for at least one saw blade tooth having a cutting edge, a trailing face and a leading face, said method comprising the steps of:
   providing a blank;
   orienting said blank a first angular amount about a first axis, a second angular amount about a second axis and a third angular amount about a third axis;
   making a pass with a cutting tool to form a curved gullet and a planar surface, both said curved gullet and said planar surface being located on said trailing face;
   moving said blank longitudinally with respect to said cutting tool;
   orienting said blank a fourth angular amount about said second axis and a fifth angular amount about said third axis; and
   making a pass with said cutting tool to form a curved gullet on said leading face;
   said curved gullet on said leading face and said planar surface on said trailing face forming said cutting edge for said tooth form.

2. The method according to claim 1 wherein said cutting tool defines a plurality of formed cutting teeth and said step of orienting said blank a first angular amount about a first axis orients said blank generally parallel to said cutting teeth.

3. The method according to claim 2 wherein the step of moving said blank longitudinally with respect to said cutting tool moves said blank generally parallel to said cutting teeth.

4. The method according to claim 1 wherein said at least one tooth is a plurality of teeth on a saw blade and wherein:
   said first pass forms said curved gullet and said planar surface on said trailing face of every other of said plurality of teeth, said curved gullet on said trailing face forming said curved gullet on said leading face of each adjacent tooth; and
   said second pass forms said curved gullet and said planar surface on said trailing face of said adjacent teeth, said curved gullet on said trailing face of said adjacent teeth forming said curved gullet on said leading face of said every other of said plurality of teeth.

5. The method according to claim 4 wherein said cutting tool defines a plurality of formed cutting teeth and said step of orienting said blank a first angular amount about a first axis orients said blank generally parallel to said cutting teeth.

6. The method according to claim 5 wherein the step of moving said blank longitudinally with respect to said cutting tool moves said blank generally parallel to said cutting teeth.

7. A method of forming a tooth form for at least one saw blade tooth with a cutting tool having an axis of rotation, said saw blade tooth having a cutting edge, a trailing face and a leading face which define a tooth pitch, said method comprising the steps of:
   providing a blank;
   determining a first angular amount said blank must be rotated about a first axis to produce said tooth form;
   determining a second angular amount said blank must be rotated about a second axis to produce said tooth form;
   determining a third angular amount said blank must be rotated about a third axis to produce said tooth form;
   locating said blank at a position with respect to said axis of rotation of said cutting wheel such that said blank is rotated said first, second and third angular amounts about said first, second and third axes, respectively;
   making a pass with respect to said cutting tool to form a curved gullet and a planar surface, both said curved gullet and said planar surface being located on said trailing face;
   adjusting said blank with respect to said cutting tool an amount equivalent to said tooth pitch;
   determining a fourth angular amount said blank must be rotated about said second axis to produce said tooth form;
   determining a fifth angular amount said blank must be rotated about said third axis to produce said tooth form;
   locating said blank at a position with respect to said axis of said cutting wheel such that said blank is rotated said first, fourth and fifth angular amounts about said first, second and third axes, respectively; and
   making a pass with respect to said cutting tool to form a curved gullet on said leading face;
   said curved gullet on said leading face and said planar surface on said trailing face forming said cutting edge for said tooth form.

8. The method according to claim 7 wherein said at least one tooth is a plurality of teeth on a saw blade and wherein:
   said first pass forms said curved gullet and said planar surface on said trailing face of every other of said plurality of teeth, said curved gullet on said trailing face forming said curved gullet on said leading face of each adjacent tooth; and
   said second pass forms said curved gullet and said planar surface on said trailing face of said adjacent teeth, said curved gullet on said trailing face of said adjacent teeth forming said curved gullet on said leading face of said every other of said plurality of teeth.

9. A method of forming a tooth form for at least one saw blade tooth having a side face, a cutting edge, a trailing face and a leading face, said method comprising the steps of:
   providing a blank;
   orienting said blank a first angular amount about a first axis, a second angular amount about a second axis and a third angular amount about a third axis;
   making a pass with a cutting tool to form a curved gullet and a planar surface, both said curved gullet and said planar surface being located on said trailing face;
   moving said blank longitudinally with respect to said cutting tool;
   orientating said blank a fourth angular amount about said second axis and a fifth angular amount about said third axis; and making a pass with said cutting tool to form a curved gullet on said leading face;

said curved gullet on said leading face and said planar surface on said trailing face being angled in opposite directions with respect to said side face to form said cutting edge for said tooth form.

10. A method of forming a tooth form for at least one saw blade tooth having a cutting edge formed by a planar surface and a curved surface, a trailing face and a leading face, said method comprising the steps of:

providing a blank;

orienting said blank a first angular amount about a first axis, a second angular amount about a second axis and a third angular amount about a third axis;

making a pass with a cutting tool to form a curved gullet and said planar surface, both said curved gullet and said planar surface being located on said trailing face;

moving said blank longitudinally with respect to said cutting tool;

orientating said blank a fourth angular amount about said second axis and a fifth angular amount about said third axis; and making a pass with said cutting tool to form a curved gullet and said curved surface, said curved gullet and said curved surface being located on said leading face;

said curved gullet on said leading face and said planar surface on said trailing face forming said cutting edge for said tooth form.

11. A method of forming a tooth form for at least one saw blade tooth having a cutting edge, a trailing face and a leading face, said method comprising the steps of:

providing a blank;

orienting said blank a first angular amount about a first axis, a second angular amount about a second axis and a third angular amount about a third axis;

making a pass with a cutting tool to form a curved gullet and a planar surface, both said curved gullet and said planar surface being located on said trailing face, said planar surface forming an acute angle with respect to one side of said blank;

moving said blank longitudinally with respect to said cutting tool;

orienting said blank a fourth angular amount about said second axis and a fifth angular amount about said third axis; and making a pass with said cutting tool to form a curved gullet on said leading face;

said curved gullet on said leading face and said planar surface on said trailing face forming said cutting edge for said tooth form.

12. A method of forming a tooth form for at least one saw blade tooth having a cutting edge, a trailing face and a leading face, said method comprising the steps of:

providing a blank;

orienting said blank a first angular amount about a first axis, a second angular amount about a second axis and a third angular amount about a third axis;

making a pass with a cutting tool to form a curved gullet and a planar surface, both said curved gullet and said planar surface being located on said trailing face, said curved gullet on said trailing face and said planar surface being formed at equal angles with respect to one side of said blank;

moving said blank longitudinally with respect to said cutting tool;

orienting said blank a fourth angular amount about said second axis and a fifth angular amount about said third axis; and making a pass with said cutting tool to form a curved gullet on said leading face;

said curved gullet on said leading face and said planar surface on said trailing face forming said cutting edge for said tooth form.

13. A method of forming a tooth form for at least one saw blade tooth with a cutting tool having an axis of rotation, said saw blade tooth having a cutting edge, a trailing face and a leading face which define a tooth pitch, said method comprising the steps of:

providing a blank;

determining a first angular amount said blank must be rotated about a first axis to produce said tooth form;

determining a second angular amount said blank must be rotated about a second axis to produce said tooth form;

determining a third angular amount said blank must be rotated about a third axis to produce said tooth form;

locating said blank at a position with respect to said axis of rotation of said cutting wheel such that said blank is rotated said first, second and third angular amounts about said first, second and third axes, respectively;

making a pass with respect to said cutting tool to form a curved gullet and a planar surface, both said curved gullet and said planar surface being located on said trailing face, said planar surface forming an acute angle with respect to one side of said blank;

adjusting said blank with respect to said cutting tool an amount equivalent to said tooth pitch;

determining a fourth angular amount said blank must be rotated about said second axis to produce said tooth form;

determining a fifth angular amount said blank must be rotated about said third axis to produce said tooth form;

locating said blank at a position with respect to said axis of said cutting wheel such that said blank is rotated said first, fourth and fifth angular amounts about said first, second and third axes, respectively; and making a pass with respect to said cutting tool to form a curved gullet on said leading face;

said curved gullet on said leading face and said planar surface on said trailing face forming said cutting edge for said tooth form.

14. A method of forming a tooth form for at least one saw blade tooth with a cutting tool having an axis of rotation, said saw blade tooth having a cutting edge, a trailing face and a leading face which define a tooth pitch, said method comprising the steps of:

providing a blank;

determining a first angular amount said blank must be rotated about a first axis to produce said tooth form;

determining a second angular amount said blank must be rotated about a second axis to produce said tooth form;

determining a third angular amount said blank must be rotated about a third axis to produce said tooth form;

locating said blank at a position with respect to said axis of rotation of said cutting wheel such that said blank is rotated said first, second and third angular amounts about said first, second and third axes, respectively;

making a pass with respect to said cutting tool to form a curved gullet and a planar surface, both said curved gullet and said planar surface being located on said trailing face, said curved gullet on said trailing face and said planar surface being formed at equal angles with respect to one side of said blank;

adjusting said blank with respect to said cutting tool an amount equivalent to said tooth pitch;

determining a fourth angular amount said blank must be rotated about said second axis to produce said tooth form;

determining a fifth angular amount said blank must be rotated about said third axis to produce said tooth form;

locating said blank at a position with respect to said axis of said cutting wheel such that said blank is rotated said first, fourth and fifth angular amounts about said first, second and third axes, respectively; and making a pass with respect to said cutting tool to form a curved gullet on said leading face;

said curved gullet on said leading face and said planar surface on said trailing face forming said cutting edge for said tooth form.

* * * * *